United States Patent
Wu

(10) Patent No.: US 10,834,559 B2
(45) Date of Patent: Nov. 10, 2020

(54) INFORMATION PROCESSING METHOD FOR MACHINE-TO-MACHINE/MAN (M2M) APPLICATION, COMMON SERVICES ENTITY (CSE) AND APPLICATION ENTITY (AE)

(71) Applicant: ZTE CORPORATION, Shenzhen (CN)

(72) Inventor: Hao Wu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 33 days.

(21) Appl. No.: 16/314,618

(22) PCT Filed: Oct. 9, 2016

(86) PCT No.: PCT/CN2016/101584
§ 371 (c)(1),
(2) Date: Dec. 31, 2018

(87) PCT Pub. No.: WO2018/000653
PCT Pub. Date: Jan. 4, 2018

(65) Prior Publication Data
US 2019/0320304 A1    Oct. 17, 2019

(30) Foreign Application Priority Data
Jun. 30, 2016   (CN) .......................... 2016 1 0511194

(51) Int. Cl.
*G06F 15/173* (2006.01)
*H04W 4/70* (2018.01)
(Continued)

(52) U.S. Cl.
CPC ............ *H04W 4/70* (2018.02); *H04L 41/06* (2013.01); *H04L 47/821* (2013.01); *H04L 67/10* (2013.01); *H04L 67/141* (2013.01)

(58) Field of Classification Search
CPC ....... H04W 4/70; H04W 12/08; H04W 12/06; H04W 4/08; H04W 12/0806; H04W 4/50;
(Continued)

(56) References Cited

U.S. PATENT DOCUMENTS

| 2012/0197958 | A1* | 8/2012 | Nightingale | .......... | G06F 9/5027 |
|---|---|---|---|---|---|
| | | | | | 709/201 |
| 2015/0023219 | A1* | 1/2015 | Jin | ...................... | H04L 12/1403 |
| | | | | | 370/259 |

(Continued)

FOREIGN PATENT DOCUMENTS

| CN | 105101040 A | 11/2015 |
|---|---|---|
| CN | 105611484 A | 5/2016 |

(Continued)

OTHER PUBLICATIONS

International Search Report dated Mar. 20, 2017 re; Application No. PCT/Cn2016/11584, pp. 1-2, citing: CN 105101040 A, CN 1056114E34 A, CN 105635936 A and WO 2015143086 A1.

(Continued)

*Primary Examiner* — Michael A Keller
*Assistant Examiner* — Thao D Duong
(74) *Attorney, Agent, or Firm* — Cantor Colburn LLP

(57) ABSTRACT

An information processing method for a Machine-to-Machine/Man (M2M) application, a Common Services Entity (CSE) and an Application Entity (AE) are provided. An information processing method for an M2M application applied to a first CSE may include that: a resource creation request sent by an AE is received; whether the resource creation request contains an AE Identifier (ID) of the AE or (Continued)

not is judged; when the resource creation request contains the AE ID of the AE, whether a resource requested to be created in the resource creation request has been created or not is judged based on the AE ID; and in a case where the resource requested to be created in the resource creation request has been created, a first response message indicating an operation failure is sent to the AE.

10 Claims, 6 Drawing Sheets

(51) Int. Cl.
 *H04L 12/24* (2006.01)
 *H04L 12/911* (2013.01)
 *H04L 29/08* (2006.01)
(58) Field of Classification Search
 CPC ......... H04W 8/18; H04W 48/16; H04W 4/00; H04L 67/12
 See application file for complete search history.

(56) References Cited

U.S. PATENT DOCUMENTS

2016/0088420 A1* 3/2016 Kim ..................... H04L 67/025
 370/328
2016/0182646 A1* 6/2016 Yu ........................... H04W 4/70
 709/228
2016/0366028 A1* 12/2016 Yin ........................ H04L 67/12

FOREIGN PATENT DOCUMENTS

CN 105635936 A 6/2016
WO 2015143086 A1 9/2015

OTHER PUBLICATIONS

EP Extended Search Report dated Apr. 18, 2019 re: Application No. EP 16 90 7049, pp. 1-9, citing: Yingjie Hong et al. "Functional Architecture" and interdigital & Ericsson et al. "Multimedia-Session-Support . . . ".

Interdigital & Ericsson et al., "Multimedia-Session-Support_TS-0001", ARC-2016-0075R01-Multimedia-Session-Support-TS-0001.DOC, OneM2M, vol. WG2—Architecture, ARC, Jan. 15, 2016, pp. 1-28, XP084014626.

Yingjie Hong et al. "Functional Architecture", TS-0001-Functional_Architecture-V2_9_0.ZIP, vol. Work Programme, Work Progr, oneM2M Partners Type 1, No. V2.9.0, Jun. 7, 2016, pp. 1-437.

* cited by examiner

INFORMATION PROCESSING METHOD FOR MACHINE-TO-MACHINE/MAN (M2M) APPLICATION, COMMON SERVICES ENTITY (CSE) AND APPLICATION ENTITY (AE)

TECHNICAL FIELD

The present disclosure relates to the technical field of communication, and particularly, to an information processing method for an M2M application, a CSE and an AE.

BACKGROUND

An M2M communication system consists of M2M nodes and an underlying network. As shown in FIG. 1, the M2M nodes communicate with one another through the underlying network. An M2M node at least includes an AE or a CSE. The AE is a logical unit executing a practical M2M application. The CSE is a logical unit managing and serving the application. An underlying Network Service Entity (NSE) provides services of device management, location-based service, device triggering and the like for the CSE, for example, a Home Subscriber Server (HSS) and a Machine Type Communication (MTC)-Interworking Function (MTC-IWF) entity.

Communication between M2M applications is implemented by interaction between CSEs. The M2M applications are required to be registered in the CSEs, the CSEs are also required to be mutually registered, and then interaction between the M2M applications may further be implemented by communication between the CSEs. An M2M system architecture is shown in FIG. 1.

In an M2M system architecture, an application node (AN) is an end execution node, for example, an intelligent electric meter, a temperature measurement and control sensor, a fire alarm and an intelligent home appliance. A Middle Node (MN) is middleware connecting the end execution node to a network-side server, for example, a gateway. An Infrastructure Node (IN) is a network-side server, and an application registered in the IN, i.e., an IN-AE, may be a management platform of an M2M Service Provider (M2M SP).

Application nodes may be divided into two types according to different functions: nodes including CSEs and nodes including no CSEs. An Application Dedicated Node (ADN) at least includes an AE and does not include any CSE. An Application Service Node (ASN) at least includes an AE and a CSE.

For implementing communication of an AE through a CSE, the AE is required to be registered in the CSE at first. A single M2M communication system has such an AE management requirement that an AE may be registered in only one CSE and may not be simultaneously registered in multiple CSEs. In an existing registration mechanism, the AE selects one CSE for registration and a selection process may be implemented by searching or pre-configuration. In a case where the CSE in which the AE is registered is not a CSE on an IN, the AE is also required to create a notification resource on the IN through a notification process. In the notification process, the CSE in which the AE is registered sends a resource creation request to the CSE on the IN and thus the CSE on the IN creates the resource for the AE for management. In the single M2M communication system, the CSE in which the AE is registered is called a registration CSE and the CSE on the IN is called an IN-CSE.

It is found in an application process that a repeated resource creation phenomenon frequently occurs and such repeated creation may bring the problems of resource waste, low notification resource utilization rate and the like.

SUMMARY

In view of the above, some embodiments of the present disclosure provide an information processing method for an M2M application, a CSE and an ASE, which may at least solve part of the problems.

The technical solutions of the embodiments of the present disclosure are implemented as follows.

An embodiment of the present disclosure provides an information processing method for an M2M application, which may be applied to a first CSE and include that:
  a resource creation request sent by an AE is received;
  whether the resource creation request contains an AE Identifier (ID) of the AE or not is judged;
  when the resource creation request contains the AE ID of the AE, whether a resource requested to be created in the resource creation request has been created or not is judged based on the AE ID; and
  in a case where the resource requested to be created in the resource creation request has been created, a first response message indicating an operation failure is sent to the AE.

As an exemplary implementation of the embodiment, the method may further include that:
  in a case where the resource requested to be created in the resource creation request has yet not been created, a resource updating request containing a CSE ID of the first CSE and the AE ID is sent to a second CSE; and
  a second response message sent by the second CSE is received,
  wherein when a CSE ID corresponding to a resource requested to be updated in the resource updating request is the same as the CSE ID of the first CSE, the second response message may be a response message indicating an operation success.

As an exemplary implementation of the embodiment, when the CSE ID corresponding to the resource requested to be updated in the resource updating request is different from the CSE ID of the first CSE, the second response message may be a response message indicating an operation failure; and
  the method may further include that:
  the first response message indicating the operation failure is sent to the AE.

As an exemplary implementation of the embodiment, when the CSE ID corresponding to the resource requested to be updated in the resource updating request is different from the CSE ID of the first CSE, the second response message may be a response message indicating an operation success which is sent after the second CSE changes the CSE ID corresponding to the resource requested to be updated in the resource updating request into the CSE ID of the first CSE; and
  the method may further include that:
  a first response message indicating an operation success is sent to the AE.

As an exemplary implementation of the embodiment, the operation that whether the resource requested to be created in the resource creation request has been created or not is judged based on the AE ID may include that:
  a resource attribute or ID of an AE type is retrieved by taking the AE ID as a query condition, and whether the resource attribute or ID of the AE type includes the AE ID or not is determined, wherein a determination result that the resource attribute or ID of the AE type includes the AE ID may represent that the resource requested to be created in the resource creation request has been created.

Another embodiment of the present disclosure provides an information processing method for an M2M application, which may be applied to a second CSE and include that:

a resource updating request sent when a first CSE determines that a resource requested to be created by an AE has yet not been created in the first CSE is received, wherein the resource updating request contains a CSE ID of the first CSE and an AE ID;

whether a CSE ID corresponding to a resource requested to be updated in the resource updating request is the CSE ID of the first CSE or not is queried; and when the CSE ID corresponding to the resource requested to be updated in the resource updating request is the CSE ID of the first CSE, resource updating is performed responsive to the resource updating request and a second response message indicating an operation success is sent to the first CSE.

As an exemplary implementation of the embodiment, the method may further include that:

when the CSE ID corresponding to the resource requested to be updated in the resource updating request is not the CSE ID of the first CSE, no response is given to the resource updating request and a second response message indicating an operation failure is sent to the first CSE.

As an exemplary implementation of the embodiment, the method may further include that:

when the CSE ID corresponding to the resource requested to be updated in the resource updating request is not the CSE ID of the first CSE, the CSE ID corresponding to the resource requested to be updated in the resource updating request is changed into the CSE ID of the first CSE, resource updating is performed responsive to the resource updating request and a second response message indicating an operation success is sent to the first CSE.

Still another embodiment of the present disclosure provides an information processing method for an M2M application, which may be applied to an AE and include that:

an AE ID allocated for the AE is acquired;

a resource creation request containing the AE ID is sent to a first CSE, the AE ID being configured for the first CSE to determine whether a resource requested to be created has been created for the AE or not; and a first response message sent by the first CSE based on the AE ID and the resource creation request is received, wherein when the first CSE has created the resource requested to be created for the AE, the first response message may be a response message indicating an operation failure.

Still another embodiment of the present disclosure provides a CSE, which may be a first CSE and include:

a first receiving unit, configured to receive a resource creation request sent by an AE;

a first judgment unit, configured to judge whether the resource creation request contains an AE ID of the AE or not;

a second judgment unit, configured to, when the resource creation request contains the AE ID of the AE, judge whether a resource requested to be created in the resource creation request has been created or not based on the AE ID; and a first sending unit, configured to, in a case where the resource requested to be created in the resource creation request has been created, send a first response message indicating an operation failure to the AE.

As an exemplary implementation of the embodiment, the first sending unit may further be configured to, in a case where the resource requested to be created in the resource creation request has yet not been created, send a resource updating request containing a CSE ID of the first CSE and the AE ID to a second CSE; and the first receiving unit may further be configured to receive a second response message sent by the second CSE based on the AE ID and the CSE ID, wherein when a CSE ID corresponding to a resource requested to be updated in the resource updating request is the same as the CSE ID of the first CSE, the second response message may be a response message indicating an operation success.

As an exemplary implementation of the embodiment, when the CSE ID corresponding to the resource requested to be updated in the resource updating request is different from the CSE ID of the first CSE, the second response message may be a response message indicating an operation failure; and the first sending unit may further be configured to send the first response message indicating the operation failure to the AE.

As an exemplary implementation of the embodiment, when the CSE ID corresponding to the resource requested to be updated in the resource updating request is different from the CSE ID of the first CSE, the second response message may be a response message indicating an operation success which is sent after the second CSE changes the CSE ID corresponding to the resource requested to be updated in the resource updating request into the CSE ID of the first CSE; and the first sending unit may further be configured to send a first response message indicating an operation success to the AE.

As an exemplary implementation of the embodiment, the second judgment unit may be configured to retrieve a resource attribute or ID of an AE type by taking the AE ID as a query condition and determine whether the resource attribute or ID of the AE type includes the AE ID or not, wherein a determination result that the resource attribute or ID of the AE type includes the AE ID may represent that the resource requested to be created in the resource creation request has been created.

Still another embodiment of the present disclosure provides a CSE, which may be a second CSE and include:

a second receiving unit, configured to receive a resource updating request sent when a first CSE determines that a resource requested to be created by an AE has yet not been created in the first CSE, wherein the resource updating request contains a CSE ID of the first CSE and an AE ID;

a query unit, configured to query whether a CSE ID corresponding to a resource requested to be updated in the resource updating request is the CSE ID of the first CSE or not; and a second sending unit, configured to, when the CSE ID corresponding to the resource requested to be updated in the resource updating request is the CSE ID of the first CSE, perform resource updating responsive to the resource updating request and send a second response message indicating an operation success to the first CSE.

As an exemplary implementation of the embodiment, the second sending unit may further be configured to, when the CSE ID corresponding to the resource requested to be updated in the resource updating request is not the CSE ID of the first CSE, give no response to the resource updating request and send a second response message indicating an operation failure to the first CSE.

As an exemplary implementation of the embodiment, the second sending unit may further be configured to, when the CSE ID corresponding to the resource requested to be updated in the resource updating request is not the CSE ID of the first CSE, change the CSE ID corresponding to the resource requested to be updated in the resource updating request into the CSE ID of the first CSE, perform resource updating responsive to the resource updating request and send a second response message indicating an operation success to the first CSE.

Still another embodiment of the present disclosure provides an AE, which may include:

an acquisition unit, configured to acquire AE ID allocated for the AE;

a third sending unit, configured to send a resource creation request containing the AE ID to a first CSE, the AE ID being configured for the first CSE to determine whether a resource requested to be created has been created for the AE or not; and a third receiving unit, configured to receive a first response message sent by the first CSE based on the AE ID and the resource creation request, wherein when the first CSE has created the resource requested to be created for the AE, the first response message may be a response message indicating an operation failure.

The embodiments of the present disclosure also provide a computer storage medium, which may store an executable instruction, the executable instruction being configured to execute and implement the information processing method for the M2M application in the abovementioned embodiments.

According to the information processing method for the M2M application, CSE and AE provided in the embodiments of the present disclosure, the AE ID in the resource creation request may be extracted responsive to the resource creation request sent by the AE, whether the resource has been created or not is judged according to the AE ID and, in a case where the resource has been created, a first response message indicating a creation failure is sent to the AE. Therefore, repeated resource creation may be avoided and resource utilization rate and disordered resource creation phenomenon caused by repeated creation may be avoided.

DETAILED DESCRIPTION OF THE EMBODIMENTS

The technical solutions of the present disclosure will further be described below in combination with the drawings and specific embodiments of the specification in detail.

Figure 1:
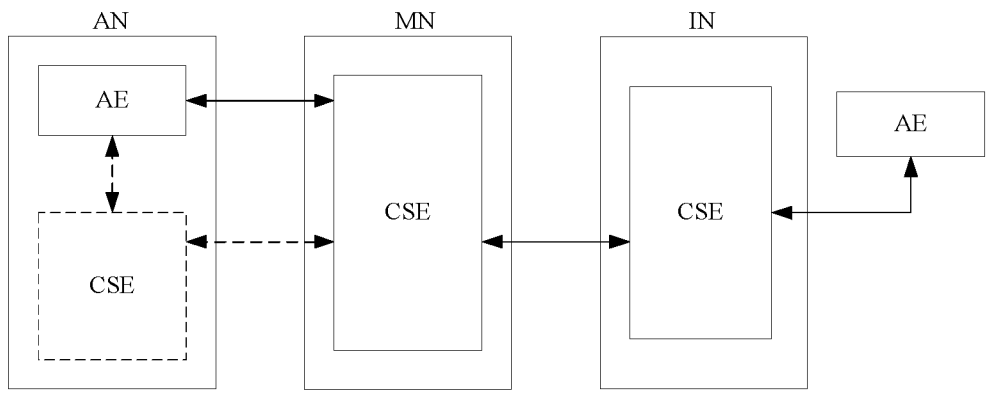
FIG. 1 is a structure diagram of an M2M communication system according to an embodiment of the present disclosure.
Figure 2:
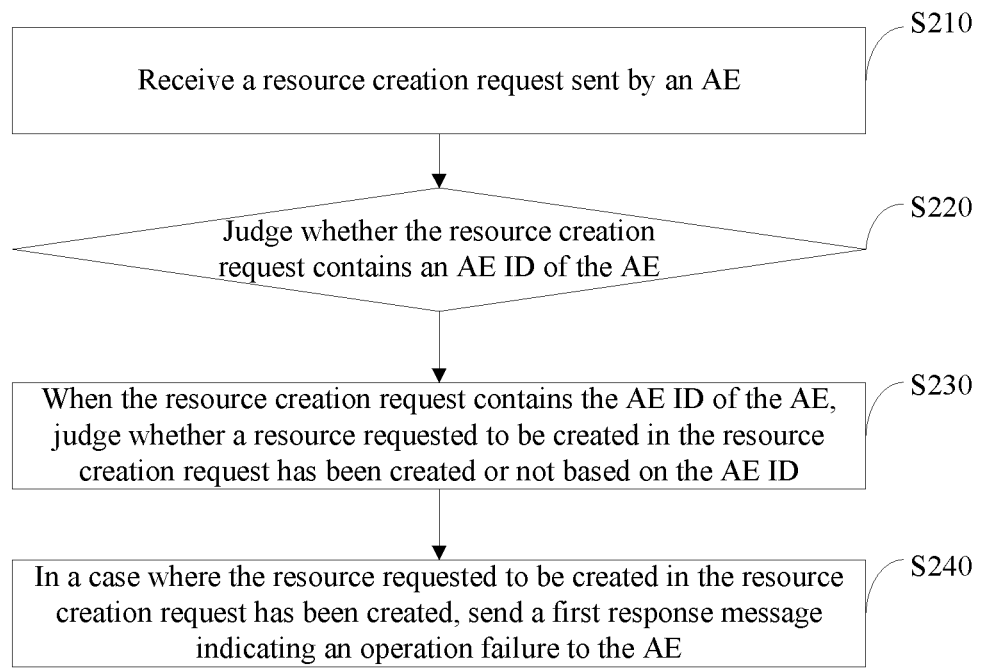
FIG. 2 is a flowchart of a first information processing method for an M2M application according to an embodiment of the present disclosure.

As shown in FIG. 2, an embodiment provides an information processing method for an M2M application, which is applied to a first CSE and includes the following operations shown in blocks S210 to S240.

In block S210, a resource creation request sent by an AE is received.

In block S220, whether the resource creation request contains an AE ID of the AE or not is judged.

In block S230, when the resource creation request contains the AE ID of the AE, whether a resource requested to be created in the resource creation request has been created or not is judged based on the AE ID.

In block S240, in a case where the resource requested to be created in the resource creation request has been created, a first response message indicating an operation failure is sent to the AE.

In the embodiment, for avoiding repeated registration and application for creation of the AE for a resource for the same purpose, the resource creation request in the embodiment may contain the AE ID of the AE. In a case where it is found in S220 that the resource creation request contains the AE ID, whether there is a resource the same as the resource presently requested to be created in the present first CSE or not may be determined according to the AE ID and, if YES, for avoiding repeated creation, the first CSE may not recreate the resource and may notify the AE of a creation failure through the first response message. It is apparent that recreation may be efficiently avoided.

The resource creation request may contain the AE ID or not contain the AE ID. For example, for a new AE which is deployed in an M2M communication system and has yet not been registered in a CSE, there is certainly no CSE allocated for the AE. The AE ID may be located in a dedicated resource in the resource creation request and may alternatively be located in an existing field, for example, a field corresponding to a parameter "from". The parameter "from" may be configured to identify a requester.

In block S230, whether the resource requested to be created in the resource creation request has been created or not is judged according to the AE ID. In a case where it has been created for the AE, for avoiding repeated creation, the resource may not be created and, instead, the operation failure is notified to the AE through the first response message. The first response message may usually further include a cause field and the cause field may be configured to indicate a cause for the operation failure. In the embodiment, the operation failure may be a resource creation failure.

Figure 3:
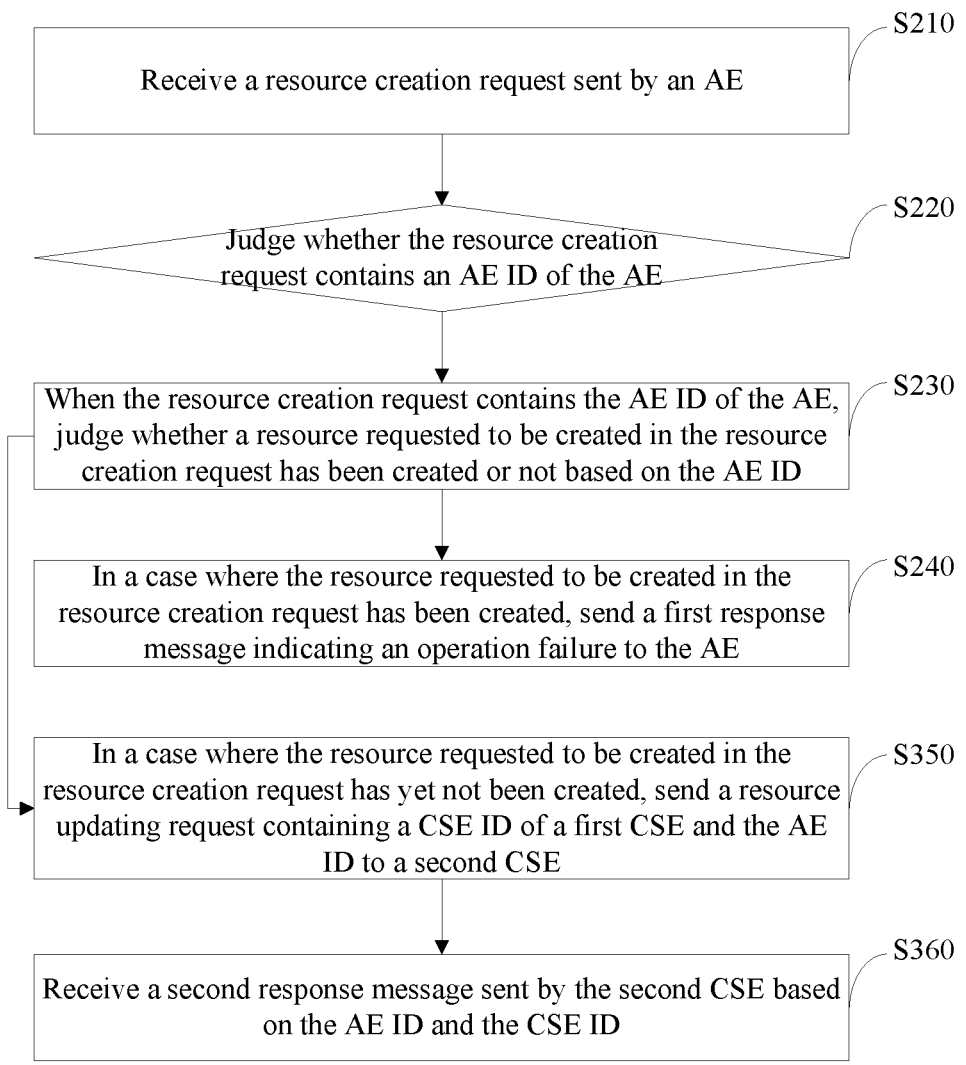
FIG. 3 is a flowchart of a second information processing method for an M2M application according to an embodiment of the present disclosure.

In some embodiments, as shown in FIG. 3, the method further includes the following operations shown in blocks S350 to S360.

In block S350, in a case where the resource requested to be created in the resource creation request has yet not been created, a resource updating request containing a CSE ID of the first CSE and the AE ID is sent to a second CSE.

In block S360, a second response message sent by the second CSE is received.

When a CSE ID corresponding to a resource requested to be updated in the resource updating request is the same as the CSE ID of the first CSE, the second response message is a response message indicating an operation success. For example, when the resource is created in the second CSE, the corresponding CSE ID may be stored in a resource attribute and may usually be a CSE ID of a registration CSE of the AE. In a case where the first CSE is the registration CSE of the AE and the resource has been created for the second CSE before, there is certainly the CSE ID of the CSE in the resource attribute of the resource.

In the embodiment, in a case where the resource requested to be created in the resource creation request has yet not been created in the first CSE, for avoiding creation of the resource for the AE in another CSE, the first CSE may also send the resource updating request to the second CSE. The second CSE may be an IN-CSE and is usually the first CSE or a superior CSE of the first CSE.

For enabling the second CSE to conveniently determine whether the same resource has been created in another CSE or not, the resource updating request may contain the CSE ID of the first CSE and the AE ID. In a case where the same resource has been created for the AE in another CSE, a record can be found in the second CSE. In the embodiment, records about creation of various resources in the CSE can be kept in the second CSE. The second CSE may query and send the corresponding response message to the first CSE. Herein, the response message is the second response message. The second response message is determined according to whether the first CSE is the registration CSE or not. Under a normal condition, in a case where an AE requests for creation of a resource, an AE ID may be allocated. Therefore, the second CSE may judge whether the first CSE is the registration CSE or not to determine whether the resource presently requested to be created has been created for the AE in another CSE or not.

Therefore, in the embodiment, when the first CSE is the registration CSE of the AE, the second response message is a response message indicating an operation success. Herein, resource updating refers to that the first CSE may create the resource requested to be created by the AE and, meanwhile, the second CSE may make a record or create a resource which is at least partially the same as that requested to be created, so as to implement backup or markup of information of service data and/or application data in the resource requested to be created by the AE in a using process through resource backup or information backup. Herein, the operation success represents a resource updating success.

In some embodiments, when the CSE ID corresponding to the resource requested to be updated in the resource updating request is different from the CSE ID of the first CSE, the second response message is a response message indicating an operation failure. The method further includes that: the first response message indicating the operation failure is sent to the AE. When the first CSE is not the registration CSE of the AE, the second CSE may directly send the second response message indicating the operation failure to the first CSE and the first CSE, after receiving the second response message indicating the operation failure, may automatically send the first response message indicating the operation failure to the AE. Therefore, requesting for creation of the resource by the AE in different CSEs is avoided and repeated resource creation and resource waste are avoided. Herein, the operation failure is a resource updating failure.

In some alternative embodiments, when the CSE ID corresponding to the resource requested to be updated in the resource updating request is different from the CSE ID of the first CSE, the second response message is a response message indicating an operation success which is sent after the second CSE changes the CSE ID corresponding to the resource requested to be updated in the resource updating request into the CSE ID of the first CSE. Herein, the second CSE finds that the first CSE is not the registration CSE of the AE but the AE may have a requirement of executing storage of the service data and/or the application data. For meeting this requirement and simultaneously avoiding repeated creation and resource waste, in the embodiment, the second CSE may change the registration CSE of the AE into the first CSE. In such a manner, the first CSE may respond to the resource creation request of the AE. In a specific implementation process, the second CSE may also send a resource deletion indication to an original registration CSE of the AE to cause the original registration CSE of the AE to delete the corresponding resource to avoid resource repetition. In addition, when the resource in the original registration CSE of the AE is deleted, whether the original registration CSE stores the data of the AE or not may also be read. For avoiding data loss, in a case where the data of the AE is read, the read data is stored in the resource newly created by the first CSE to avoid data loss. A specific reading manner may be embodied as follows. The first CSE may receive data that is read by the second CSE from the original registration CSE and forwarded by the second CSE. Alternatively, when a connection can be established between the first CSE and the original registration CSE, the first CSE may receive a reading instruction sent by the second CSE and reads the corresponding data from the original registration CSE. The original registration CSE may delete the data corresponding to the AE only after the data is read.

In such case, the method further includes that: a first response message indicating an operation success is sent to the AE. The AE, after receiving the first response message, may determine the operation success and may store the data in the resource requested to be created.

In the embodiment, S230 may include that: a resource attribute or ID of an AE type is retrieved by taking the AE ID as a query condition, and whether the resource attribute or ID of the AE type includes the AE ID or not is determined. A determination result that the resource attribute or ID of the AE type includes the AE ID represents that the resource requested to be created in the resource creation request has been created. When the resource is created, for identifying the specific AE to which each AE resource belongs, the corresponding AE ID may be stored in the resource attribute or a resource ID. Therefore, in the embodiment, the resource attribute or ID of the AE type may be queried to determine whether the resource requested to be created in the resource creation request has been created or not.

Figure 4:
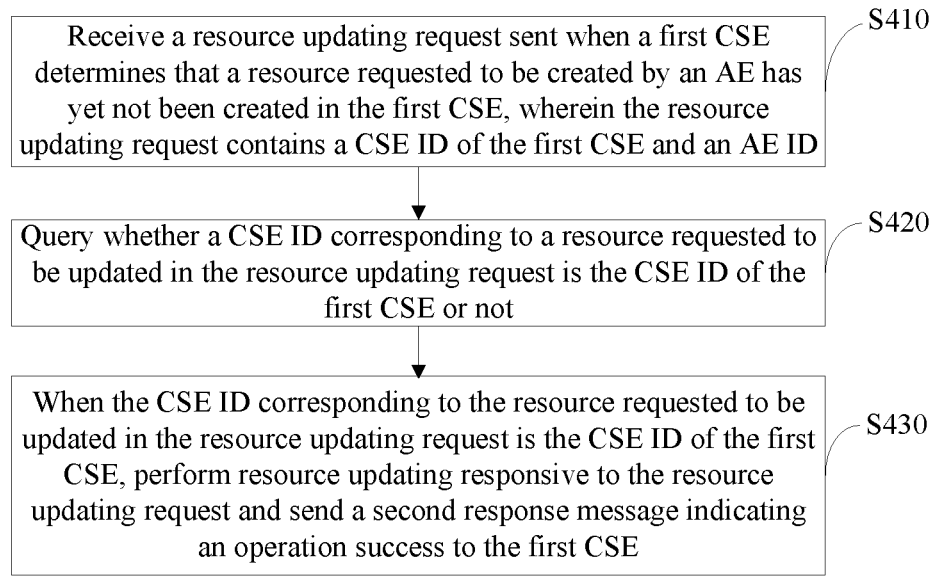
FIG. 4 is a flowchart of a third information processing method for an M2M application according to an embodiment of the present disclosure.

As shown in FIG. 4, an embodiment provides an information processing method for an M2M application, which is applied to a second CSE. Herein, the second CSE may be the abovementioned IN-CSE. The method includes the following operations shown in blocks S410 to S430.

In block S410, a resource updating request sent when a first CSE determines that a resource requested to be created by an AE has yet not been created in the first CSE is received, wherein the resource updating request contains a CSE ID of the first CSE and an AE ID.

In block S420, whether a CSE ID corresponding to a resource requested to be updated in the resource updating request is the CSE ID of the first CSE or not is queried.

In block S430, when the CSE ID corresponding to the resource requested to be updated in the resource updating request is the CSE ID of the first CSE, resource updating is performed responsive to the resource updating request and a second response message indicating an operation success is sent to the first CSE.

In the embodiment, the second CSE may receive the resource updating request sent when the first CSE determines that the resource requested to be created by the AE has yet not been created in the first CSE, and the resource updating request contains the CSE ID of the first CSE and the AE ID.

The second CSE, after receiving the resource updating request, may query whether a CSE corresponding to the resource requested to be updated in the resource updating request by the AE is the first CSE or not by taking the received AE ID as a query basis. In a case where the CSE ID of the corresponding CSE is the same as the CSE ID of the first CSE, it is indicated that the AE requests for creation of the corresponding resource for the first time and the second response message indicating the operation success is sent to the first CSE. Therefore, the first CSE, after receiving the second response message, may create the resource requested to be created by the AE and, after successful creation, sends the first response message indicating the operation success to the AE.

When the first CSE is not a registration CSE, various processing methods may be adopted. In the embodiment, at least the following two implementation modes are provided.

A First Mode

The method further includes that: when the CSE ID corresponding to the resource requested to be updated in the resource updating request is not the CSE ID of the first CSE, no response is given to the resource updating request and a second response message indicating an operation failure is sent to the first CSE.

A Second Mode

The method may further include that:

when the CSE ID corresponding to the resource requested to be updated in the resource updating request is not the CSE ID of the first CSE, the CSE ID corresponding to the resource requested to be updated in the resource updating request is changed into the CSE ID of the first CSE, resource updating is performed responsive to the resource updating request and a second response message indicating an operation success is sent to the first CSE.

In a specific implementation process, whether the CSE ID corresponding to the resource requested to be updated in the resource updating request is the CSE ID of the first CSE can be judged by determining whether the CSE ID corresponding to the resource requested to be updated in the resource updating request is a registration CSE ID of the AE. In a case where the CSE ID is the registration CSE ID of the AE, the CSE ID may be stored in a resource attribute of the resource requested to be updated.

It is to be noted that, in a case where the first CSE is changed into a registration CSE of the AE and corresponding data of the AE has been stored in the registration CSE, it is also suggested to perform data migration or indicate data migration. A specific data migration or migration indication manner may refer to the abovementioned part. After data migration, an effect of storing the data, stored in the original registration CSE before, of the AE into the resource newly created by the first CSE to avoid data loss is achieved.

In some embodiments, S430 may include that: whether a connection parameter corresponding to the AE includes the CSE ID or not is queried, wherein when the connection parameter does not include the CSE ID, it is determined that the first CSE is not the connection registration CSE.

When the AE requests for resource registration, the registration CSE may establish a connection attribute corresponding to the AE, the AE ID of the AE and the CSE ID of the registration CSE being stored in the connection attribute. Therefore, in the embodiment, when whether the first CSE is the registration CSE of the AE or not is judged, whether the CSE ID of the first CSE is stored in the connection attribute or not may be conveniently judged. Therefore, a method for conveniently determining whether the first CSE is the registration CSE or not is provided herein. Of course, in a specific implementation process, whether the first CSE is the registration CSE of the AE or not may alternatively be determined through other information recording the CSE ID of the registration CSE of the AE.

Figure 5:
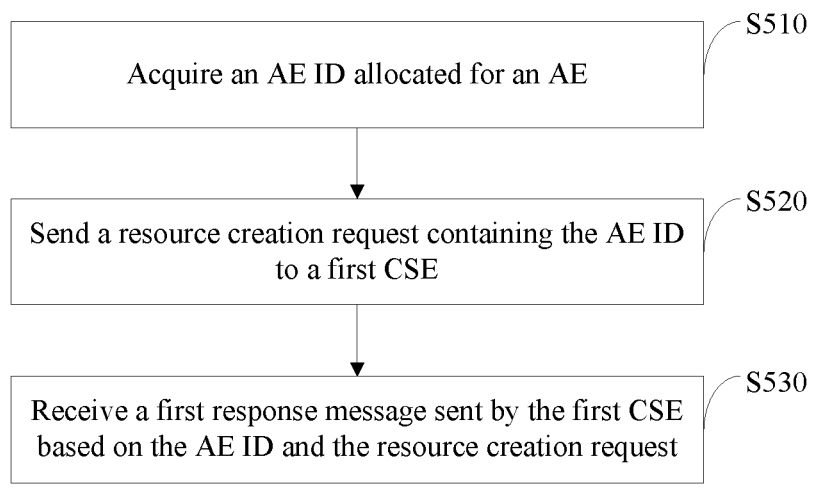
FIG. 5 is a flowchart of a fourth information processing method for an M2M application according to an embodiment of the present disclosure.

As shown in FIG. 5, an embodiment provides an information processing method for an M2M application, which is applied to an AE and includes the following operations shown in blocks S510 to S530.

In block S510, an AE ID allocated for the AE is acquired.

In block S520, a resource creation request containing the AE ID is sent to a first CSE, the AE ID being configured for the first CSE to determine whether a resource requested to be created has been created for the AE or not.

In block S530, a first response message sent by the first CSE based on the AE ID and the resource creation request is received.

When the first CSE has created the resource requested to be created for the AE, the first response message is a response message indicating an operation failure.

According to the information processing method for the M2M application in the embodiment, the AE, before sends the resource creation request, may contain the AE ID allocated for the AE in the resource creation request. Therefore, the first CSE may conveniently determine whether the AE has been registered or not and whether the AE ID has been allocated or not. Under a normal condition, in a case where an AE has been registered, a corresponding AE ID may be allocated for the AE.

In block S520, the first response message sent by the first CSE based on the AE ID and the resource creation request may be received. The first response message may be a response message indicating an operation failure and may alternatively be a response message indicating an operation success. Specific time when the response message indicating a creation success is received and specific time when the response message indicating an operation failure is received may refer to corresponding parts of the method applied to the first CSE.

Figure 6:
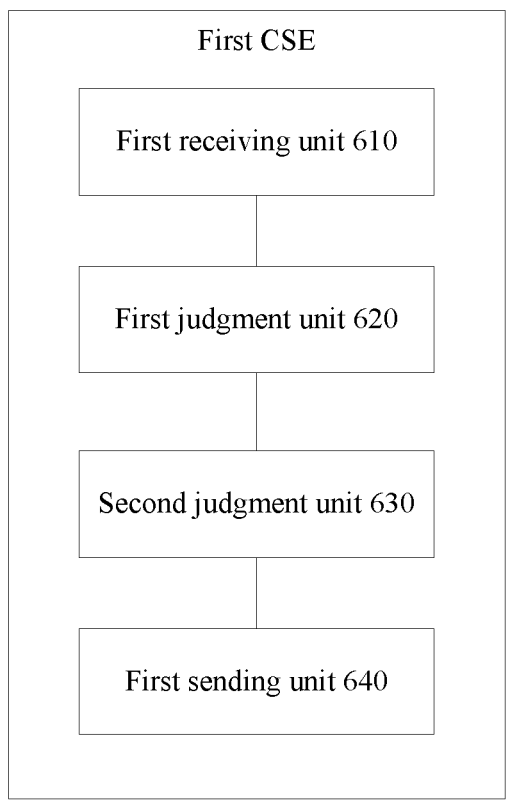
FIG. 6 is a structure diagram of a first CSE according to an embodiment of the present disclosure.

As shown in FIG. 6, an embodiment of the present disclosure provides a CSE, which is a first CSE and includes:

a first receiving unit 610, configured to receive a resource creation request sent by an AE;

a first judgment unit 620, configured to judge whether the resource creation request contains an AE ID of the AE or not;

a second judgment unit 630, configured to, when the resource creation request contains the AE ID of the AE, judge whether a resource requested to be created in the resource creation request has been created or not based on the AE ID; and a first sending unit 640, configured to, in a case where the resource requested to be created in the resource creation request has been created, send a first response message indicating an operation failure to the AE.

The first CSE provided in the embodiment is a CSE capable of performing AE registration and resource creation in an M2M communication system.

The first receiving unit 610 and the first sending unit 640 correspond to a communication interface, configured to establish a connection and communicate with the AE, of the first CSE. The interface may be a wired interface or a wireless interface and, in any case, may be configured to perform data interaction with the AE.

The first judgment unit 620 and the second judgment unit 630 may correspond to a processor or a processing circuit. The processor may be various processors such as a Central Processing Unit (CPU), a Digital Signal Processor (DSP), a Programmable Logic Controller (PLC), a Micro Control Unit (MCU) or an Application Processor (AP). The processing circuit may include an application-specific integrated circuit and the like.

The processor or the processing circuit may execute a predetermined instruction to complete operations of the first judgment unit and the second judgment unit is connected with a communication interface corresponding to the first receiving unit 610 and the first sending unit 640 through a bus. Repeated resource creation may be avoided.

In some embodiments, the first sending unit 640 is further configured to, in a case where the resource requested to be created in the resource creation request has yet not been created, send a resource updating request containing a CSE ID of the first CSE and the AE ID to a second CSE.

The first receiving unit 610 is further configured to receive a second response message sent by the second CSE based on the AE ID and the CSE ID.

When a CSE ID corresponding to a resource requested to be updated in the resource updating request is the same as the CSE ID of the first CSE, the second response message may be a response message indicating an operation success.

In the embodiment, the communication interface corresponding to the first sending unit 640 and the first receiving unit 610 may further be configured for connection and communication with the second CSE. Not only may repeated resource creation for the AE in the first CSE be avoided, but also repeated resource creation for the AE in different CSEs may also be avoided.

In some embodiments, when the CSE ID corresponding to the resource requested to be updated in the resource updating request is different from the CSE ID of the first CSE, the second response message is a response message indicating an operation failure. The first sending unit 640 is further configured to send the first response message indicating the operation failure to the AE.

Of course, when the CSE ID corresponding to the resource requested to be updated in the resource updating request is different from the CSE ID of the first CSE, the second response message is a response message indicating an operation success which is sent after the second CSE changes the CSE ID corresponding to the resource requested to be updated in the resource updating request into the CSE ID of the first CSE. The first sending unit 640 is further configured to send a first response message indicating an operation success to the AE.

In addition, the second judgment unit 630 is configured to retrieve a resource attribute or ID of an AE type by taking the AE ID as a query condition and determine whether the resource attribute or ID of the AE type includes the AE ID or not. A determination result that the resource attribute or ID of the AE type includes the AE ID represents that the resource requested to be created in the resource creation request has been created. Therefore, whether the resource presently requested to be created by the AE has been created in the first CSE or not may be conveniently determined.

Figure 7:
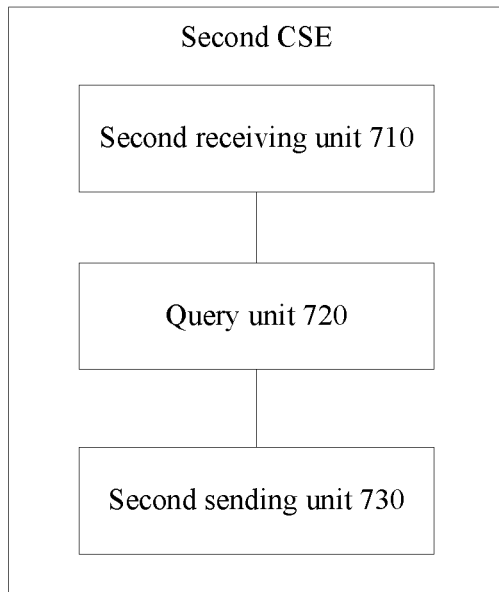
FIG. 7 is a structure diagram of a second CSE according to an embodiment of the present disclosure.

As shown in FIG. 7, an embodiment provides a second CSE, which includes:

a second receiving unit 710, configured to receive a resource updating request sent when a first CSE determines that a resource requested to be created by an AE has yet not been created in the first CSE, wherein the resource updating request contains a CSE ID of the first CSE and an AE ID;

a query unit 720, configured to query whether a CSE ID corresponding to a resource requested to be updated in the resource updating request is the CSE ID of the first CSE or not; and a second sending unit 730, configured to, when the CSE ID corresponding to the resource requested to be updated in the resource updating request is the CSE ID of the first CSE, perform resource updating responsive to the resource updating request and send a second response message indicating an operation success to the first CSE.

In the embodiment, the second CSE may be the above-mentioned IN-CSE.

The second receiving unit 710 and the second sending unit 730 may correspond to a communication interface, establishing a connection and communicating with the first CSE, of the second CSE. Herein, the communication interface may alternatively be an optical cable interface or a cable interface.

The query unit 720 may also correspond to a processor or a processing circuit. Herein, detailed descriptions about the processor or the processing circuit may refer to the descriptions about the processor or processing circuit in the first CSE and no more elaborations will be made herein.

In the embodiment, the second CSE and the first CSE avoid requesting for creation of the same resource by the same AE in different CSEs, so that a resource waste phenomenon caused by repeated resource creation is avoided.

In some embodiments, the second sending unit 730 is further configured to, when the CSE ID corresponding to the resource requested to be updated in the resource updating request is not the CSE ID of the first CSE, give no response to the resource updating request and send a second response message indicating an operation failure to the first CSE.

In some alternative embodiments, the second sending unit 730 is further configured to, when the CSE ID corresponding to the resource requested to be updated in the resource updating request is not the CSE ID of the first CSE, change the CSE ID corresponding to the resource requested to be updated in the resource updating request into the CSE ID of the first CSE, perform resource updating responsive to the resource updating request and send a second response message indicating an operation success to the first CSE.

In some alternative embodiments, the query unit 720 may be configured to query whether a connection parameter corresponding to the resource requested to be updated in the resource updating request includes the CSE ID or not, wherein when the connection parameter does not include the CSE ID, it is determined that the first CSE is not a registration CSE. Therefore, the connection parameter may be queried to conveniently determine whether the first CSE is the registration CSE of the AE or not.

Figure 8:
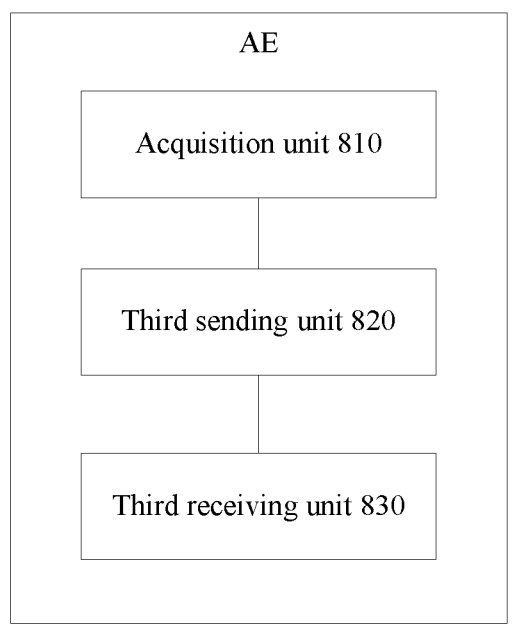
FIG. 8 is a structure diagram of an AE according to an embodiment of the present disclosure.

In addition, as shown in FIG. 8, an embodiment provides an AE, which includes:

an acquisition unit 810, configured to acquire AE ID allocated for the AE;

a third sending unit 820, configured to send a resource creation request containing the AE ID to a first CSE, the AE ID being configured for the first CSE to determine whether a resource requested to be created has been created for the AE or not; and a third receiving unit 830, configured to receive a first response message sent by the first CSE based on the AE ID and the resource creation request, When the first CSE has created the resource requested to be created for the AE, the first response message is a response message indicating an operation failure.

The AE provided in the embodiment may be various AEs. Herein, the third sending unit 820 and the third receiving unit 830 may correspond to a communication interface communicating with the first CSE and may alternatively be a wired interface and a wireless interface.

The acquisition unit 810 may also correspond to a processor or a processing circuit. The processor or the processing circuit is connected with a storage medium and reads and obtains the AE ID of the AE in a registration process from the storage medium. Detailed descriptions about the processor or the processing circuit may refer to the abovementioned embodiment and will not be repeatedly introduced herein.

The AE contains the AE ID in the resource creation request, so that repeated resource creation may be avoided and an effective utilization rate of the resource may be increased.

Two specific examples will be provided below in combination with any abovementioned embodiment.

. A First Example

The example provides an information processing method for an M2M application, which includes the following operations.

In operation 1, an AE sends a resource creation request message to a registration CSE to request for creation of a resource. In the request message, a value of a parameter "from" is set to be S. Herein, S indicates requesting for both of registration in the registration CSE and registration in an IN-CSE.

In operation 2, the registration CSE, after receiving a request of the AE, verifies whether the AE meets a registration condition or not and, if YES, sends a resource creation request to the IN-CSE to request for creation of a notification resource <AEAnnc> for the AE on the IN-CSE. The notification resource is configured for remote registration management over the AE and is namely configured for AE management of the IN-CSE on a network server. The request message includes a CSE-ID of the registration CSE. The CSE-ID is configured to identify the CSE. The operation that whether the registration condition is met or not is verified may include that: whether data and application information and CSE information contained in service subscription information locally stored in the registration CSE are consistent with information reported by the AE or not is checked. The CSE-ID corresponds to the abovementioned CSE ID.

In operation 3, the IN-CSE, after receiving the request message, verifies whether the registration condition is met or not, and in a case where the registration condition is met and the request message does not include an AE-ID (a scenario where the AE-ID is included will be described in subsequent operations, i.e., a re-registration scenario), the IN-CSE allocates the AE-ID and sets the AE-ID in a link attribute of the resource <AEAnnc>. In such case, the link attribute includes the CSE-ID of the registration CSE and the AE-ID. Herein, the AE-ID corresponds to the abovementioned AE ID.

In operation 4, the IN-CSE sends a response message to the registration CSE to indicate a resource creation success.

In operation 5, the registration CSE, after receiving a success response, creates a resource <AE>.

In operation 6, the registration CSE sends a response message to the AE, the AE-ID being included therein.

In operation 7, the AE sends a resource creation request to a CSE2 different from the registration CSE to request for creation of the resource <AE>, the parameter "from" in the request message being set to be the AE-ID.

In operation 8, the CSE2, after receiving the request of the AE, verifies whether the registration condition is met or not. In a case where the registration condition is met and the parameter "from" includes the AE-ID, the CSE2 locally searches whether there is a value equivalent to the AE-ID in a resource attribute or ID of an AE type or not and, if YES, sends a response message to the AE, the response message indicating a failure. If NO, subsequent operations are continued. Herein, the CSE2 and the registration CSE may be the same CSE and may alternatively be different CSEs.

In operation 9, the CSE2 sends a resource updating request to the IN-CSE to request to update the resource <AEAnnc>. In the request message, a parameter "to" is set to be the CSE-ID of the IN-CSE and the AE-ID received from the AE, a parameter "from" is set to be the AE-ID and a parameter link includes a CSE-ID of the CSE2.

In operation 10, the IN-CSE, after receiving the request message, verifies whether the registration condition is met or not, if YES, further verifies whether the CSE-ID in the link attribute, the parameter "to" points to, of the resource <AEAnnc> is the same as the CSE-ID in the parameter link in the request message or not, if YES, sends a response message to the CSE2 to indicate the operation success and, if NO, sends a response message to the CSE2 to indicate the operation failure. Herein, the link attribute corresponds to the abovementioned connection attribute.

In operation 11, the CSE2 sends a response message to the AE to indicate the operation failure.

A Second Example

The example provides an information processing method for an M2M application, which includes the following operations.

In operation 11, an AE sends a resource creation request message to a registration CSE to request for creation of a resource. In the request message, a value of a parameter "from" is set to be S.

In operation 12, the registration CSE, after receiving a request of the AE, verifies whether the AE meets a registration condition or not and, if YES, sends a resource creation request to an IN-CSE to request for creation of a notification resource <AEAnnc> for the AE on the IN-CSE. The notification resource is configured for remote registration management over the AE and is namely configured for AE management of the IN-CSE on a network server. The request message includes a CSE-ID of the registration CSE. The CSE-ID is configured to identify the CSE.

In operation 13, the IN-CSE, after receiving the request message, verifies whether the registration condition is met or not, and in a case where the registration condition is met and the request message does not include an AE-ID (a scenario where the AE-ID is included will be described in subsequent operations, i.e., a re-registration scenario), the IN-CSE allocates the AE-ID and sets the AE-ID in a link attribute of the resource <AEAnnc>. In such case, the link attribute includes the CSE-ID of the registration CSE and the AE-ID.

In operation 14, the IN-CSE sends a response message to the registration CSE to indicate a resource creation success.

In operation 15, the registration CSE, after receiving a success response, creates a resource <AE>. Herein, <AE> represents a resource of an AE type.

In operation 16, the registration CSE sends a response message to the AE, the AE-ID being included therein. Herein, the AE-ID is the abovementioned AE ID.

In operation 17, the AE sends a resource creation request to a CSE2 different from the registration CSE to request for creation of the resource <AE>, the parameter "from" in the request message being set to be the AE-ID.

In operation 18, the CSE2, after receiving the request of the AE, verifies whether the registration condition is met or not. In a case where the registration condition is met and the parameter "from" includes the AE-ID, the CSE2 locally searches whether there is a value equivalent to the AE-ID in a resource attribute or ID of the AE type or not and, if YES, sends a response message to the AE, the response message indicating a failure. If NO, subsequent operations are continued.

In operation 19, the CSE2 sends a resource updating request to the IN-CSE to request to update the resource <AEAnnc>. In the request message, a parameter "to" is set to be the CSE-ID of the IN-CSE and the AE-ID received from the AE, a parameter "from" is set to be the AE-ID and a parameter link includes a CSE-ID of the CSE2. Herein, the CSE-ID is the abovementioned CSE ID.

In operation 20, the IN-CSE, after receiving the request message, verifies whether the registration condition is met or not, if YES, further verifies whether the CSE-ID in the link attribute, the parameter "to" points to, of the resource <AEAnnc> is the same as the CSE-ID in the parameter link in the request message or not, if YES, sends a response message to the CSE2 to indicate the operation success and, if NO, sends a resource deletion request to a CSE corresponding to the CSE-ID in the link parameter of the resource <AEAnnc> to request to delete the resource for the AE on the CSE, then updates the link attribute of the resource <AEAnnc> to include the CSE-ID of the CSE2 and then sends a response message to the CSE2 to indicate the operation success.

In operation 21, the CSE2 sends a response message to the AE to indicate an operation success.

A Third Example

Figure 9:
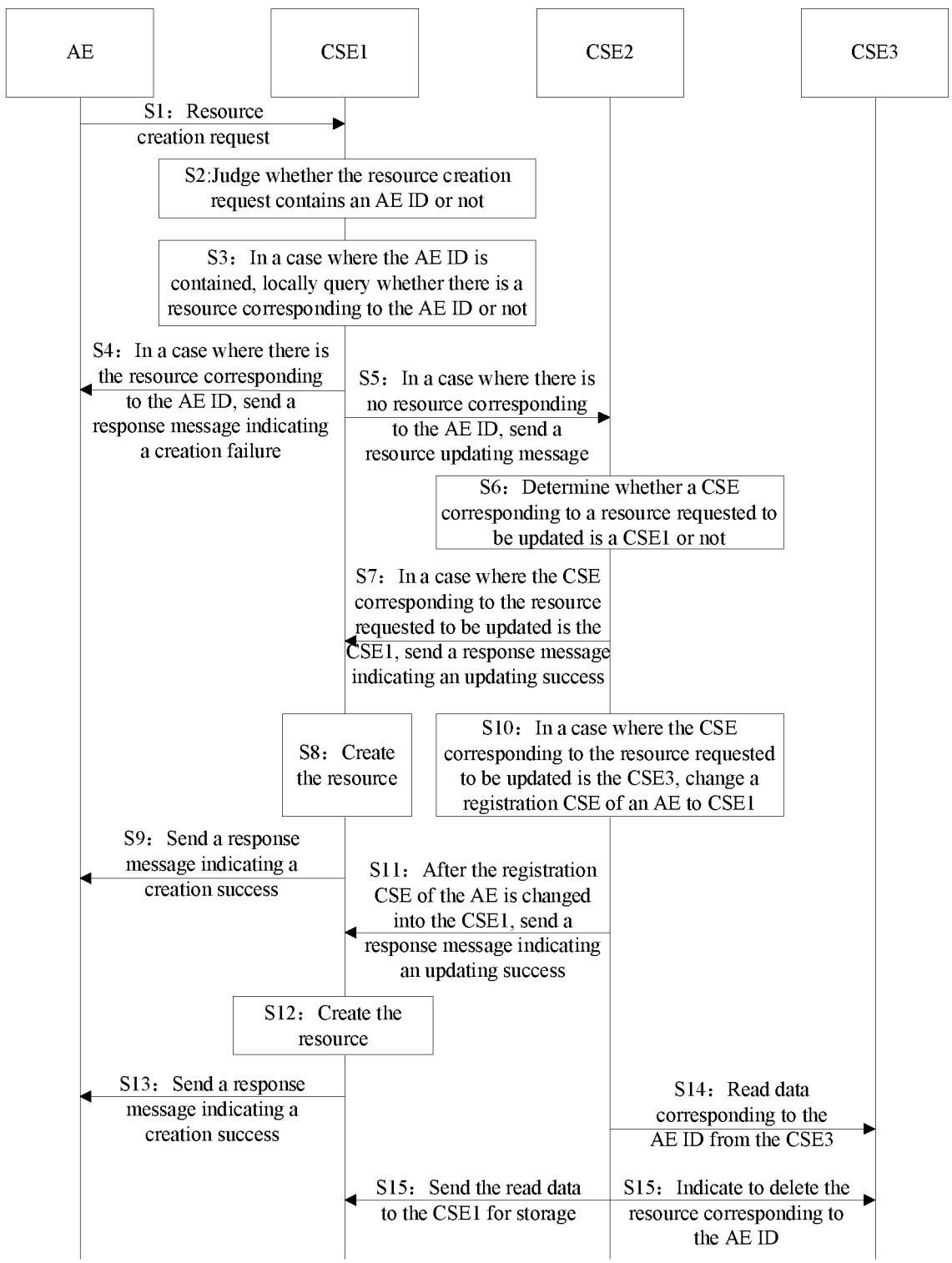
FIG. 9 is a flowchart of a fifth information processing method for an M2M application according to an embodiment of the present disclosure.

As shown in FIG. 9, the example provides an M2M application management method, which includes the following operations.

In operation S1, an AE sends a resource creation request to a CSE1.

In operation S2, the CSE1 judges whether the resource creation request contains an AE ID or not.

In operation S3, in a case where the AE ID is contained, whether there is a resource corresponding to the AE ID or not is locally queried. Herein, local refers to a local database of the CSE1.

In operation S4, in a case where there is the resource corresponding to the AE ID, the CSE1 sends a response message indicating an operation failure to the AE.

In operation S5, in a case where there is no resource corresponding to the AE ID, a resource updating message is sent to a CSE2.

In operation S6, the CSE2 determines whether a CSE corresponding to a resource requested to be updated is the CSE1 or not, in a case where it is the CSE1, S7 is executed and, in a case where it is a CSE3, S10 is executed.

In operation S7, in a case where the CSE corresponding to the resource requested to be updated is the CSE1, the CSE2 sends a response message indicating an updating success to the CSE1.

In operation S8, the CSE creates the resource.

In operation S9, the CSE1 sends a response message indicating a creation success to the AE.

In operation S10, in case of the CSE3, a registration CSE of the AE is changed into the CSE1.

In operation S11, after the registration CSE of the AE is changed into the CSE1, the CSE2 sends a response message indicating an updating success to the CSE1.

In operation S12, the CSE1 creates the resource.

In operation S13, a response message indicating a creation success is sent.

In operation S14, data corresponding to the AE ID is read from the CSE3.

In operation S15, the resource corresponding to the AE ID is indicated to be deleted and the read data is sent to the CSE1 for storage.

In some embodiments provided by the application, it should be understood that the disclosed device and method may be implemented in another manner. The device embodiment described above is only schematic. For example, division of the units is only logic function division, and other division manners may be adopted during practical implementation. For example, multiple units or components may be combined or integrated into another system, or some characteristics may be neglected or not executed. In addition, coupling, or direct coupling or communication connection between each displayed or discussed component may be indirect coupling or communication connection, implemented through some interfaces, of the device or the units, and may be electrical and mechanical or adopt other forms.

The abovementioned units described as separate parts may or may not be physically separated, and parts displayed as units may or may not be physical units, and namely may be located in the same place, or may alternatively be distributed to multiple network units. Part or all of the units may be selected to achieve the purpose of the solutions of the embodiments according to a practical requirement.

In addition, each function unit in each embodiment of the present disclosure may be integrated into a processing unit, each unit may also exist independently, and two or more than two unit may alternatively be integrated into a unit. The abovementioned integrated unit may be implemented in a hardware form, and may alternatively be implemented in form of hardware and software function unit.

Those of ordinary skill in the art should know that: all or part of the operations of the abovementioned method embodiment may be implemented by instructing related hardware through a program, the abovementioned program may be stored in a computer-readable storage medium, and the program is executed to execute the operations of the abovementioned method embodiment. The storage medium includes: various media capable of storing program codes such as a mobile storage device, a Read-Only Memory (ROM), a Random Access Memory (RAM), a magnetic disk or an optical disk.

The above is only the specific implementation mode of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

INDUSTRIAL APPLICABILITY

The technical solutions provided in the embodiments of the present disclosure may be applied to an information processing process for the M2M application. The AE ID in the resource creation request may be extracted responsive to the resource creation request sent by the AE, whether the resource has been created or not is judged according to the AE ID and, in a case where the resource has been created, the first response message indicating the creation failure is sent to the AE. Therefore, repeated resource creation may be avoided and resource utilization rate and disordered resource creation phenomenon caused by repeated creation may be avoided.

What is claimed is:

1. An information processing method for a Machine-to-Machine/Man (M2M) application, applied to a first Common Services Entity (CSE) and comprising:
   receiving a resource creation request sent by an Application Entity (AE);
   judging whether the resource creation request contains an AE Identifier (ID) of the AE or not;
   when the resource creation request contains the AE ID of the AE, judging whether a resource requested to be created in the resource creation request has been created or not based on the AE ID; and
   in a case where the resource requested to be created in the resource creation request has been created, sending a first response message indicating an operation failure to the AE;
   in a case where the resource requested to be created in the resource creation request has yet not been created, sending a resource updating request containing a CSE ID of the first CSE and the AE ID to a second CSE; and
   receiving a second response message sent by the second CSE,
   wherein
   when a CSE ID corresponding to a resource requested to be updated in the resource updating request is the same as the CSE ID of the first CSE, the second response message is a response message indicating an operation success;
   when the CSE ID corresponding to the resource requested to be updated in the resource updating request is different from the CSE ID of the first CSE, the second response message is a response message indicating an operation failure, and the first CSE sends the first response message indicating the operation failure to the AE; or, the second response message is a response message indicating an operation success which is sent after the second CSE changes the CSE ID corresponding to the resource requested to be updated in the resource updating request into the CSE ID of the first CSE, and the first CSE sends a first response message indicating an operation success to the AE.

2. The method as claimed in claim 1, wherein
   judging whether the resource requested to be created in the resource creation request has been created or not based on the AE ID comprises:
   retrieving a resource attribute or ID of an AE type by taking the AE ID as a query condition, and determining whether the resource attribute or ID of the AE type comprises the AE ID or not,
   wherein a determination result that the resource attribute or ID of the AE type comprises the AE ID represents that the resource requested to be created in the resource creation request has been created.

3. The method as claimed in claim 1, further comprising:
   receiving, by the first CSE from the second CSE, AE data that is read by the second CSE from a registration CSE, having the CSE ID corresponding to the resource requested to be updated in the resource updating request, of the AE.

4. The method as claimed in claim 1, further comprising:
   when a connection is able to be established between the first CSE and a registration CSE, having the CSE ID corresponding to the resource requested to be updated in the resource updating request, of the AE, receiving, by the first CSE, a reading instruction sent by the second CSE and reading, by the first CSE, AE data from the registration CSE.

5. An information processing method for a Machine-to-Machine/Man (M2M) application, applied to a second Common Services Entity (CSE) and comprising:
   receiving a resource updating request sent when a first CSE determines that a resource requested to be created by an Application Entity (AE) has yet not been created in the first CSE, wherein the resource updating request contains a CSE Identifier (ID) of the first CSE and an AE ID;
   querying whether a CSE ID corresponding to a resource requested to be updated in the resource updating request is the CSE ID of the first CSE or not; and
   when the CSE ID corresponding to the resource requested to be updated in the resource updating request is the CSE ID of the first CSE, performing resource updating responsive to the resource updating request and sending a second response message indicating an operation success to the first CSE;
   when the CSE ID corresponding to the resource requested to be updated in the resource updating request is not the CSE ID of the first CSE, giving no response to the resource updating request and sending the second response message indicating an operation failure to the first CSE, or changing the CSE ID corresponding to the resource requested to be updated in the resource updating request into the CSE ID of the first CSE, performing resource updating responsive to the resource updating request and sending the second response message indicating an operation success to the first CSE.

6. The method as claimed in claim 5, further comprising:
   reading, by the second CSE, AE data from a registration CSE, having the CSE ID corresponding to the resource requested to be updated in the resource updating request, of the AE, and forwarding, by the second CSE, the AE data to the first CSE;
   or,
   when a connection is able to be established between the first CSE and a registration CSE, having the CSE ID corresponding to the resource requested to be updated in the resource updating request, of the AE, sending, by the second CSE, a reading instruction to the first CSE to cause the first CSE to read AE data from the registration CSE.

7. The method as claimed in claim 5, further comprising: sending, by the second CSE, a resource deletion indication to a registration CSE, having the CSE ID corresponding to the resource requested to be updated in the resource updating request, of the AE to cause the registration CSE of the AE to delete the corresponding resource.

8. A Common Services Entity (CSE), the CSE being a first CSE and comprising:
   a first receiving unit, configured to receive a resource creation request sent by an Application Entity (AE);
   a first judgment unit, configured to judge whether the resource creation request contains an AE Identifier (ID) of the AE or not;
   a second judgment unit, configured to, when the resource creation request contains the AE ID of the AE, judge whether a resource requested to be created in the resource creation request has been created or not based on the AE ID; and
   a first sending unit, configured to, in a case where the resource requested to be created in the resource creation request has been created, send a first response message indicating an operation failure to the AE;
   wherein the first sending unit is further configured to, in a case where the resource requested to be created in the resource creation request has yet not been created, send a resource updating request containing a CSE ID of the first CSE and the AE ID to a second CSE; and
   the first receiving unit is further configured to receive a second response message sent by the second CSE based on the AE ID and the CSE ID,
   wherein when a CSE ID corresponding to a resource requested to be updated in the resource updating request is the same as the CSE ID of the first CSE, the second response message is a response message indicating an operation success;
   when the CSE ID corresponding to the resource requested to be updated in the resource updating request is different from the CSE ID of the first CSE, the second response message is a response message indicating an operation failure, and the first sending unit is further configured to send the first response message indicating the operation failure to the AE; or, the second response message is a response message indicating an operation success which is sent after the second CSE changes the CSE ID corresponding to the resource requested to be updated in the resource updating request into the CSE ID of the first CSE, and the first sending unit is further configured to send a first response message indicating an operation success to the AE.

9. The CSE as claimed in claim 8, wherein the second judgment unit is configured to retrieve a resource attribute or ID of an AE type by taking the AE ID as a query condition and determine whether the resource attribute or ID of the AE type comprises the AE ID or not,
   wherein a determination result that the resource attribute or ID of the AE type comprises the AE ID represents that the resource requested to be created in the resource creation request has been created.

10. A Common Services Entity (CSE), the CSE being a second CSE and comprising:
    a second receiving unit, configured to receive a resource updating request sent when a first CSE determines that a resource requested to be created by an Application Entity (AE) has yet not been created in the first CSE, wherein the resource updating request contains a CSE Identifier (ID) of the first CSE and an AE ID;
    a query unit, configured to query whether a CSE ID corresponding to a resource requested to be updated in the resource updating request is the CSE ID of the first CSE or not; and
    a second sending unit, configured to, when the CSE ID corresponding to the resource requested to be updated in the resource updating request is the CSE ID of the first CSE, perform resource updating responsive to the resource updating request and send a second response message indicating an operation success to the first CSE;
    wherein
    the second sending unit is further configured to, when the CSE ID corresponding to the resource requested to be updated in the resource updating request is not the CSE ID of the first CSE, give no response to the resource updating request and send the second response message indicating an operation failure to the first CSE; or,
    the second sending unit is further configured to, when the CSE ID corresponding to the resource requested to be updated in the resource updating request is not the CSE ID of the first CSE, change the CSE ID corresponding to the resource requested to be updated in the resource updating request into the CSE ID of the first CSE, perform resource updating responsive to the resource updating request and send the second response message indicating an operation success to the first CSE.

* * * * *